Patented May 23, 1944

2,349,572

UNITED STATES PATENT OFFICE 2,349,572

INSECTICIDE

Gerald H. Coleman, Fred W. Fletcher, and Wesley D. Schroeder, Midland, Mich., assignors to The Dow Chemical Company, Midland, Mich., a corporation of Michigan No Drawing. Application October 24, 1941, Serial No. 416,371

7 Claims. (Cl. 167—24)

This invention relates to insecticides and is particularly directed to new compositions of matter adapted to be employed as contact poisons for the control of household and agricultural parasites.

According to the present invention an alkyl or alkenyl ether of 3.5.x-trichloro-2-hydroxy-diphenyl is componded with a suitable inert carrier and/or compatible parasiticidal toxicant to obtain a composition adapted to be employed for the control of common household and agricultural insect pests. Compositions in which the new ether compounds are employed as active toxicants are characterized by a high effectiveness when applied as contact poisons. The new ether compounds as a class are substantially insoluble in water, somewhat soluble in many organic solvents, and sufficiently inert as not to react with other known insecticidal toxicants. The compounds are high boiling liquids or low melting crystalline solids, stable on exposure to light, air, and water, lacking in objectionable odor, and relatively nonirritating and nontoxic to higher forms of animal life.

Compositions comprising from about 2 to 10 per cent by weight of these ethers dissolved in a noncorrosive organic solvent may be advantageously employed as fly sprays, moth proofers, roach sprays, and the like. For the control of agricultural pests such as red spider, aphis, etc., the compounds are preferably employed in aqueous dispersions or as the constituents of finely-divided dust compositions. In preparing aqueous spray mixtures, the compounds may simply be dispersed in water. A preferred procedure comprises mixing the toxicant with or depositing it on a water-insoluble, finely-divided solid carrier to form a concentrate, and thereafter dispersing the dry composition in water. An ultimate concentration of from about 0.01 to 3 per cent by weight of the toxicant in the aqueous composition is adequate. In preparing dust compositions, the proportion of toxicant employed is dependent upon whether or not the dust is to be used as a concentrate for the preparation of aqueous dispersions or applied for pest control without further modification. If a concentrate is desired, from about 5 to 80 per cent by weight of the toxicant may be employed, depending upon the physical nature of the particular ether and carrier selected. In finished dusting compositions from about 0.5 to 5.0 per cent of toxicant is preferred.

The ether toxicant may advantageously be combined with other insecticidal materials such as pyrethrin- or rotenone-containing extracts, lead arsenate, petroleum oil, organic thiocyanates, etc. When mixtures of the ethers with the plant extract toxicants are employed, a greater than additive effect as regards toxicity is obtained for the resulting composition.

Among the solvents which may be employed as carriers for the ether toxicants are petroleum distillates, carbon tetrachloride, chloroform, ethylene chloride, chlorobenzene, methyl-ethyl ketone, methanol, ethanol, propanol, and water. While simple solutions or dispersions may be employed, it is also intended that the scope of the present invention include compositions wherein the ether toxicants are dissolved or dispersed in either the continuous or discontinuous phase of emulsions.

In the preparation of concentrates and dust compositions, carriers such as bentonite, diatomaceous earth kieselguhr, volcanic ash, pyrophyllite, talc, wood flour, finely-divided carbon, and the like may be employed. Wetting agents which may be incorporated in either liquid or dust compositions include the alkali and alkaline earth metal caseinates, blood albumen, alkali metal salts of long chain aliphatic sulphates, partially neutralized sulphuric acid derivatives of petroleum oils and natural occurring glycerides, sulphonated derivatives of phenols and aromatic hydrocarbons and their salts, soaps, condensation products of alkylene oxides with organic acids, alkanolamines, etc.

The following examples are illustrative of certain modes in which the invention may be employed but are not to be construed as limiting the same.

*Example 1*

2.48 grams of the methyl ether of 3.5.x-trichloro-2-hydroxy-diphenyl (melting at 77°–79° C.) was dissolved in 5 milliliters of methyl ethyl ketone and the solution diluted to a total volume of 100 milliliters with a petroleum distillate fraction boiling at 345°–508° F., and having a flash point of 137° F. This composition was employed as a spray against five-day old houseflies according to the Peet-Grady method (Soap 8, No. 4, 1932). The composition was found to give a 30.4 per cent kill of the flies in 24 hours. A determination was also carried out on an analogous solution comprising 2.48 grams of the methyl ether of 3.5.x-trichloro-2-hydroxy-diphenyl and 50 milligrams of pyrethrins per 100 milliliters of solution. This composition killed 88.4 per cent of the flies in 24 hours. A petroleum distillate control solution containing 50 milligrams of pyrethrin as the sole toxicant per 100 milliliters gave an average kill of 25 per cent against houseflies.

*Example 2*

The ethyl ether of 3.5.x-trichloro-2-hydroxy-diphenyl (melting at 61°–63° C.) was employed to produce a spray mixture substantially as described in Example 1 except that the 2.48 grams of ether was first dissolved in 20 milliliters of methyl ethyl ketone and thereafter made up to a volume of 100 milliliters with the petroleum distillate. This composition gave a kill against houseflies of 24.1 per cent in 2 hours. When modified by the inclusion of 50 milligrams of pyrethrins per 100 milliliters, the composition gave a kill of 59.8 per cent.

*Example 3*

In a similar manner, the normalbutyl ether of 3.5.x-trichloro-2-hydroxy-diphenyl (boiling at 177°–179° C. at 1.5 millimeters pressure and having a specific gravity of 1.266 at 25°/25° C.) was employed in petroleum distillate solution both alone and in combination with pyrethrins. In a mixture of 2.48 grams to 100 milliliters, this compound gave a kill of 20.6 per cent. A combination with the usual amount of pyrethrin gave a composition killing 52.3 per cent of the test insects.

*Example 4*

2.48 grams of the allyl ether of 3.5.x-trichloro-2-hydroxy-diphenyl (boiling at 206°–209° C. at 4 millimeters pressure) was dissolved in 20 milliliters of methyl ethyl ketone and the resulting solution diluted with sufficient of the petroleum fraction to give a total volume of 100 milliliters. This composition gave a kill against houseflies of 53.5 per cent when tested as described in the preceding examples. When modified with 50 milligrams of pyrethrins per 100 milliliters of composition, the spray material killed 79.4 per cent of the flies.

Other ether compounds which may be employed in the manner set forth in the foregoing examples include the isopropyl, secondaryamyl, normaloctyl, normalbutenyl, delta-2-hexenyl ethers of 3.5.x-trichloro-2-hydroxy-diphenyl, etc. Similarly, the disclosed compositions and other mixtures comprising the new toxicants may be employed for the control of other household pests and agricultural insect organisms.

The expression "noncorrosive organic solvent" as herein employed refers to any organic solvent material unreactive with and capable of dissolving the toxicants hereinbefore described and noninjurious to the skin and general health of humans under the conditions of use.

The ether compounds with which the present application is concerned are described and claimed in an application Serial No. 416,368 filed concurrently herewith.

These compounds are prepared by reacting a suitable etherifying agent such as an organic sulphate, alkyl or alkenyl halide, etc., in the presence of an alkali metal hydroxide.

The 3.5.x-trichloro-2-hydroxy-diphenyl employed in the preparation of the ethers is obtained by reacting 2-hydroxy-diphenyl with gaseous chlorine. In a representative preparation 0.5 mol of 2-hydroxy-diphenyl was dissolved in 45 milliliters of tetrachloroethylene and the solution heated to 90°–95° C. Chlorine gas was passed through the phenol solution at this temperature until the amount of hydrogen chloride evolved indicated the reaction of 3 mols of chlorine. The crude reaction product solidified upon cooling, and was dissolved in hot petroleum ether and recrystallized. After several recrystallizations there was obtained a 49 per cent yield of 3.5.x-trichloro-2-hydroxy-diphenyl as a white solid melting at 117°–118.5° C. This compound was substantially insoluble in water, slightly soluble in kerosene, and somewhat soluble in carbon tetrachloride and 95 per cent ethyl alcohol. Upon analysis, the phenol was found to contain 38.95 per cent chlorine as compared to a theoretical chlorine content of 39 per cent. The position of the third chlorine atom in the hydroxylated benzene ring was determined by the oxidation of the compound to form benzoic acid.

We claim:

1. An insecticidal composition comprising a carrier and as an active toxicant a compound selected from the group consisting of the alkyl and alkenyl ethers of 3.5.x-trichloro-2-hydroxy-diphenyl.

2. An insecticidal composition comprising an inert diluent and as an active toxicant a compound selected from the group consisting of the alkyl and alkenyl ethers of 3.5.x-trichloro-2-hydroxy-diphenyl.

3. An insecticidal composition comprising as an active toxicant a compound selected from the group consisting of alkyl and alkenyl ethers of 3.5.x-trichloro-2-hydroxy-diphenyl dissolved in a noncorrosive organic solvent.

4. An insecticidal composition comprising an inert diluent and as an active toxicant the methyl ether of 3.5.x-trichloro-2-hydroxy-diphenyl.

5. An insecticidal composition comprising an inert diluent and as an active toxicant the ethyl ether of 3.5.x-trichloro-2-hydroxy-diphenyl.

6. An insecticidal composition comprising an inert diluent and as an active toxicant the alkenyl ether of 3.5.x-trichloro-2-hydroxy-diphenyl.

7. An insecticidal composition comprising pyrethrins and as an added toxicant a compound selected from the group consisting of alkyl and alkyenyl ethers of 3.5.x-trichloro-2-hydroxy-diphenyl.

GERALD H. COLEMAN.
FRED W. FLETCHER.
WESLEY D. SCHROEDER.